United States Patent
Pham

(10) Patent No.: US 9,545,758 B2
(45) Date of Patent: Jan. 17, 2017

(54) TWO PIECE MANDREL MANUFACTURING SYSTEM

(71) Applicant: The Boeing Company, Chicago, IL (US)

(72) Inventor: Doan Dinh Pham, Richland, MI (US)

(73) Assignee: THE BOEING COMPANY, Chicago, IL (US)

( * ) Notice: Subject to any disclaimer, the term of this patent is extended or adjusted under 35 U.S.C. 154(b) by 234 days.

(21) Appl. No.: 14/444,803

(22) Filed: Jul. 28, 2014

(65) Prior Publication Data

US 2016/0023407 A1  Jan. 28, 2016

(51) Int. Cl.
  *B29C 70/34* (2006.01)
  *B29C 70/42* (2006.01)
  *B29L 31/30* (2006.01)

(52) U.S. Cl.
  CPC ............... *B29C 70/34* (2013.01); *B29C 70/42* (2013.01); *B29L 2031/3076* (2013.01)

(58) Field of Classification Search
  None
  See application file for complete search history.

(56) References Cited

U.S. PATENT DOCUMENTS

| | | | | |
|---|---|---|---|---|
| 4,267,142 A | * | 5/1981 | Lankheet | B29C 70/44 264/102 |
| 5,318,422 A | * | 6/1994 | Erland | B29C 43/3607 264/313 |
| 5,322,719 A | * | 6/1994 | Westling | B29C 43/203 269/20 |
| 5,865,945 A | * | 2/1999 | McConaughy | B29C 63/0004 156/579 |
| 7,052,573 B2 | | 5/2006 | Pham et al. | |

* cited by examiner

*Primary Examiner* — Barbara J Musser
(74) *Attorney, Agent, or Firm* — Yee & Associates, P.C.

(57) ABSTRACT

A method and apparatus for manufacturing a composite structure. The apparatus comprises a base section and a locking section. The base section of a mandrel has a channel with an opening that receives a portion of a bagging material wrapped around an exterior surface of the base section. The locking section of the mandrel engages the channel such that the portion of the bagging material in the channel is held inside the channel.

19 Claims, 19 Drawing Sheets

TWO PIECE MANDREL MANUFACTURING SYSTEM

BACKGROUND INFORMATION

1. Field

The present disclosure relates generally to manufacturing composite structures and, in particular, to manufacturing composite structures for aircraft. Still more particularly, the present disclosure relates to a method and apparatus for manufacturing composite structures using mandrels.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Composite materials may be used to create aerospace composite structures. For example, composite materials may be used to create a fuselage, a wing, or other structures for the aircraft.

In manufacturing composite structures, layers of composite material are typically laid up on a tool. The layers may be comprised of fibers in sheets. These sheets may take the form of fabrics, tape, tows, or other suitable forms. In some cases, resin may be infused or pre-impregnated into the sheets. These types of sheets are commonly referred to as prepreg.

The different layers of prepreg may be laid up in different orientations and different numbers of layers may be used depending on the thickness of the composite structure being manufactured. These layers may be laid up by hand or using automated lamination equipment such as a tape laminating machine or a fiber placement system.

After the different layers of composite material have been laid up on the tool, the layers of composite material may be consolidated and cured upon exposure to temperature and pressure, thus forming the final composite structure. With a wing, stringers may be associated with a composite skin to form the wing in a number of different ways. For example, the stringers may be cured and trimmed. The stringers may then be bonded to an uncured skin. In another example, uncured stringers may be co-bonded to the cured skin. In yet another illustrative example, uncured stringers may be cured together with an uncured skin. This type of process of curing all components together at the same time is called co-cure.

Curing a composite structure involves applying heat and, often times, also includes applying pressure. The pressure may be applied by applying a vacuum to a bag enclosing the composite structure. With respect to stringers, mandrels are used with vacuum bags to define a shape for the stringers when curing the composite materials for the stringers. The shapes may include a hat shape, an I beam, or other suitable shapes. Additionally, the mandrel also defines the stringer configuration and shape, and reduces wrinkles on the stringers.

As the length of the wing increases, the length of the stringers also increases. For example, a stringer may be about 90 feet or longer.

Increasing the length of the stringers results in more time to manufacture the stringer. For example, the time to bag the stringer for curing increases. With a stringer that is about 90 feet long, the time needed to install a mandrel and bag the stringer for curing may be about 4 hours for each stringer. Thus, the time for manufacturing a wing may be greater than desired. Additionally, this increase of time for processing stringers results in a need for additional mandrels and other tools. As a result, the tooling cost for manufacturing a wing may increase more than desired.

Therefore, it would be desirable to have a method and apparatus that take into account at least some of the issues discussed above, as well as other possible issues. For example, it may be desirable to have a method and apparatus that reduce the time needed to install a mandrel for a stringer and to bag the stringer.

SUMMARY

In one illustrative embodiment, an apparatus comprises a base section and a locking section. The base section of a mandrel has a channel with an opening that receives a portion of a bagging material wrapped around an exterior surface of the base section. The locking section of the mandrel engages the channel such that the portion of the bagging material in the channel is held inside the channel.

In another illustrative embodiment, a mandrel bagging system comprises a base section, a locking section, and a platform. The base section of a mandrel has a channel with an opening that receives a portion of a bagging material wrapped around an exterior surface of the base section. The locking section of the mandrel engages the channel such that the portion of the bagging material in the channel is held inside the channel. The platform has a first planar section, a second planar section, and a compressible section located between the first planar section and the second planar section. The compressible section presses the bagging material against a first side of the exterior surface when the base section is moved downward against the compressible section.

In yet another illustrative embodiment, a method for manufacturing a composite structure is provided. A bagging material is placed on a platform. A base section of a mandrel is placed on the bagging material on the platform. A portion of the bagging material is moved through an opening in the base section into a channel in the base section with the bagging material wrapped around an exterior surface of the base section. The base section is moved downward onto the bagging material on the platform at a compressible section of the platform located between a first planar section and a second planar section of the platform. The compressible section presses the bagging material against a first side of the exterior surface of the base section when the base section is moved downward against the compressible section. A locking section of the mandrel is moved though the opening into the channel with the portion of the bagging material in the channel. The locking section in the channel is engaged such that the bagging material is held in place around the base section.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that in addition to the time needed to bag a stringer, the use of mandrels may result in undesired inconsistencies in the stringers. For example, the illustrative embodiments recognize and take into account that when the composite skin is uncured, the weight of the mandrel for a stringer may cause a portion of the stringer to sink. This situation may result in an undesired shape at the edge of the stringer. In other words, the stringer may have a wave instead of a substantially flat shape as desired.

One manner in which the wave shape may be avoided is through placing uncured stringers on a cured skin. The uncured stringers may then be co-bonded to the skin and then cured. The illustrative embodiments recognize and take into account that this process results in performance curing operations twice. In other words, the skin is cured in an autoclave. Thereafter, the stringer is placed onto the cured skin and then cured in the autoclave co-bonding the stringer to the cured skin. Although this type of process may avoid the wave in the shape, increased time and cost occurs through additional steps and time needed for two curing steps.

The illustrative embodiments provide a method and apparatus that reduce or solve the issues involved with forming a skin with stringers. For example, a mandrel that is a two piece mandrel is used in the illustrative example in a manner that reduces at least one of the time needed to bag a stringer with the mandrel, sinking of the stringer into the skin when both components are uncured, or reducing the number of curing operation.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some examples, "at least one of" may be, for example, without limitation, two of item A; one of item B; and ten of item C; four of item B and seven of item C; or other suitable combinations.

Figure 1:
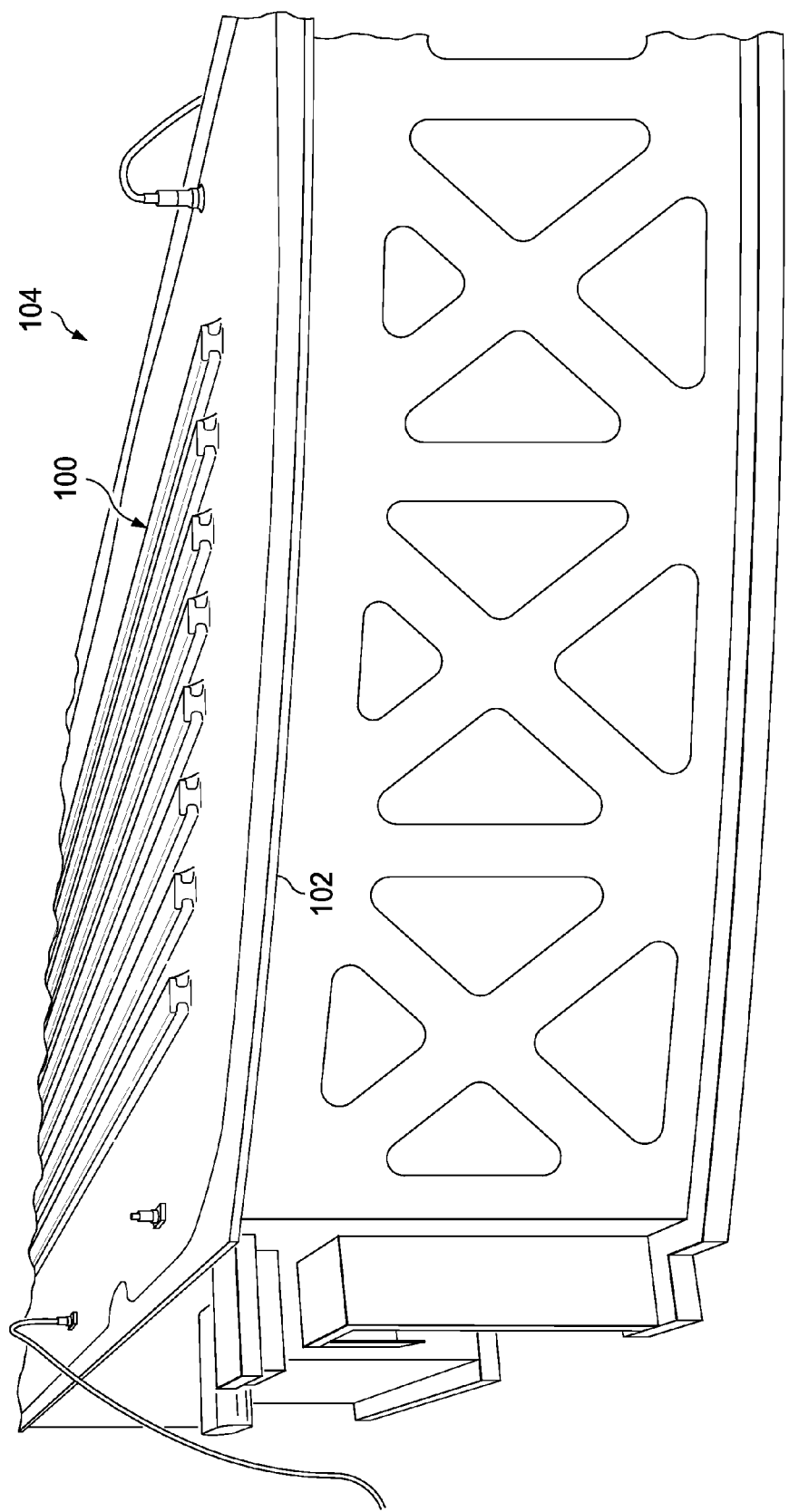
FIG. 1 is an illustration of a wing with stringers in accordance with an illustrative embodiment.

Turning next to FIG. 1, an illustration of a wing with stringers is depicted in accordance with an illustrative embodiment. In this illustrative example, stringers 100 are located on skin 102 for wing 104. As depicted in this illustrative example, stringers 100 on skin 102 may be formed using an illustrative embodiment.

In other illustrative examples, a stringer is an elongate structure. A stringer may be placed on a skin or other structure of an aircraft. The stringer may operate to transfer bending loads from the skin to another structure in the aircraft.

Figure 2:
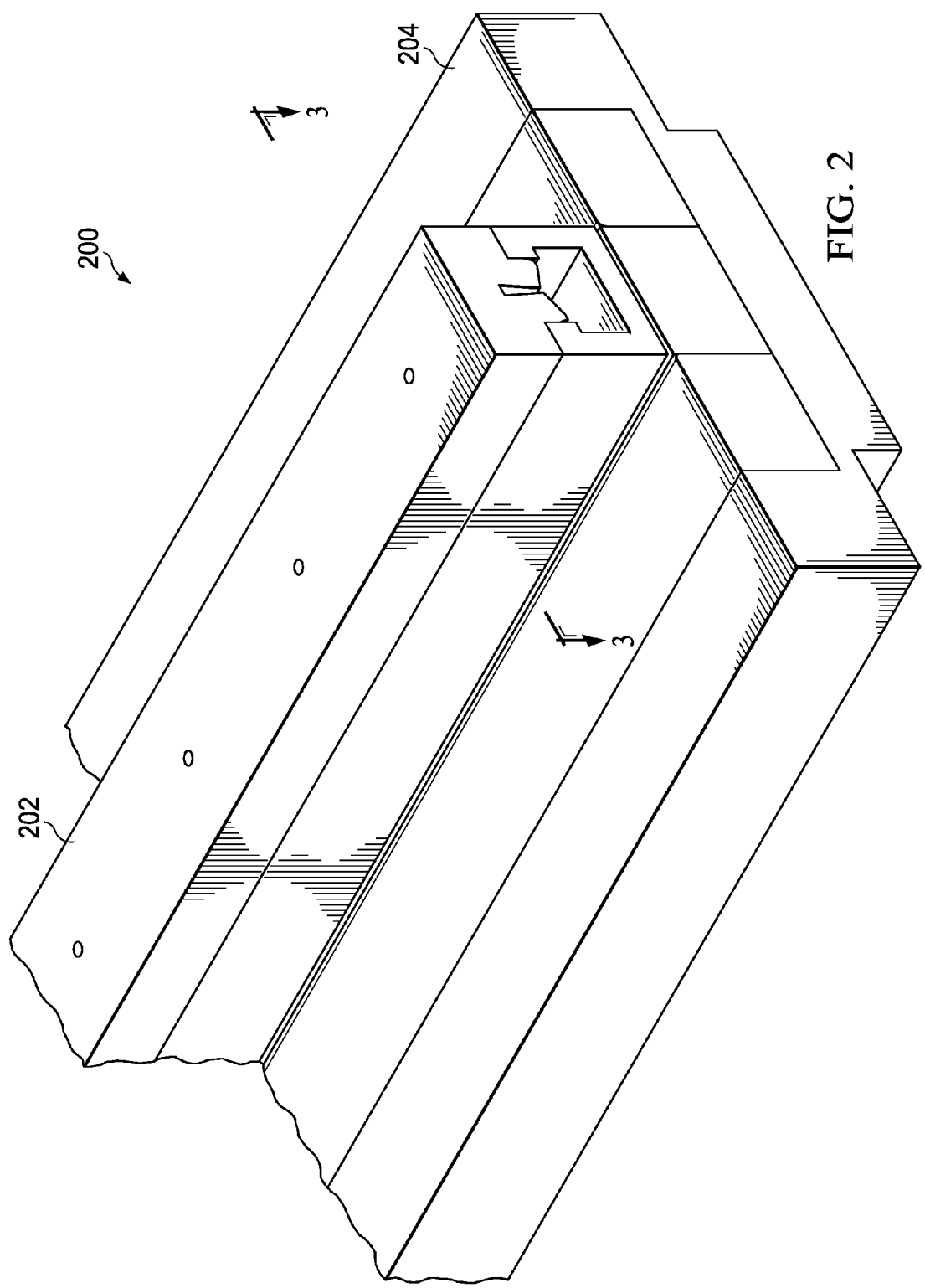
FIG. 2 is an illustration of a tool system in accordance with an illustrative embodiment.

Turning next to FIG. 2, an illustration of a tool system is depicted in accordance with an illustrative embodiment. In this depicted example, tool system 200 may be used to layup and bag composite structures. In particular, tool system 200 may be used to form stringers 100 in FIG. 1.

In this illustrative example, tool system 200 comprises a number of components. As depicted, tool system 200 includes mandrel 202 and platform 204.

Mandrel 202 is a physical elongate device. Platform 204 is also a physical device and may be a bagging table on which mandrel 202 may be placed for manufacturing a stringer. A bagging material (not shown) may be wrapped around mandrel 202 on platform 204. As depicted, mandrel 202 with the bagging material may be used to lay up layers of composite material (not shown) into a shape of a stringer and bagging the stringer.

Figure 3:
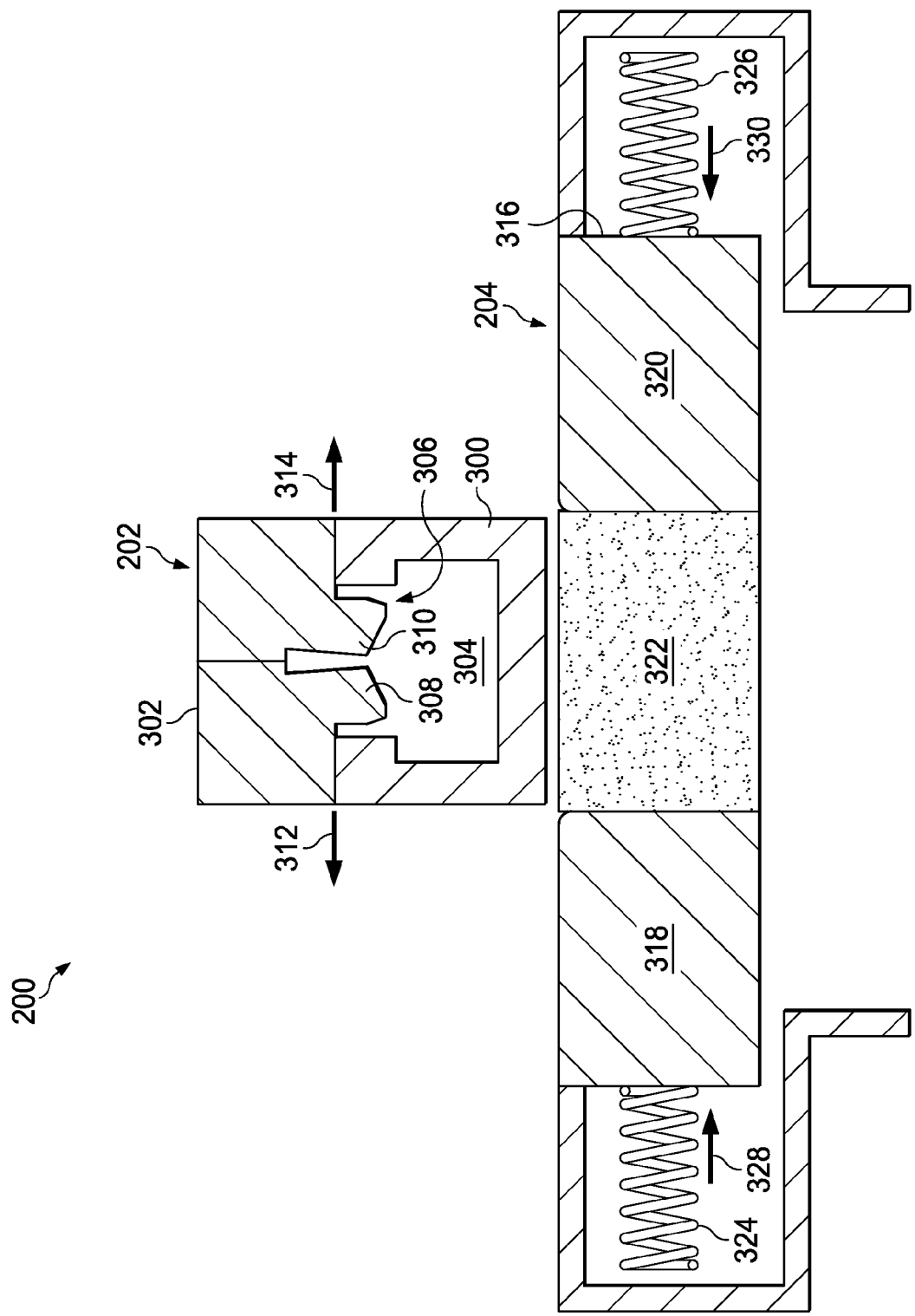
FIG. 3 is an illustration of a cross-sectional view of a tool system in accordance with an illustrative embodiment.

Turning next to FIG. 3, an illustration of a cross-sectional view of a tool system is depicted in accordance with an illustrative embodiment. This view of tool system 200 is taken along lines 3-3 in FIG. 2.

In this illustrative example, mandrel 202 is a two piece mandrel. These two pieces are base section 300 and locking section 302.

As depicted, base section 300 of mandrel 202 has channel 304 with opening 306. Channel 304 is a hollow portion of base section 300 in this illustrative example.

Base section 300 is a rigid piece of mandrel 202. Base section 300 may be comprised of different materials. The material may be comprised of a material selected from one of graphite, graphite foam, titanium, aluminum, invar, ceramic, or some other suitable material. The material may be selected based on an ability to withstand an environment present in curing composite materials. The environment may be temperatures and times during which the temperatures are encountered. The material may also be selected based on reducing the weight of base section. For example, the material may be selected from at least one of graphite, graphite foam, aluminum, titanium, invar, ceramic, or other lightweight and stable material.

In this illustrative example, locking section 302 of mandrel 202 engages channel 304. As depicted, locking section 302 is flexible. Locking section 302 may be a material selected from one of a nylon, a plastic, an aluminum, or other suitable materials. For example, the material selected for locking section 302 is a flexible material. The material used in locking section 302 may be selected to have a weight that is lighter than the materials currently used in mandrels. As shown, locking section 302 has first flange 308 and second flange 310 located in opening 306 of base section 300.

First flange 308 may move in the direction of arrow 312, and second flange 310 may move in the direction of arrow 314 to engage channel 304. In particular, first flange 308 and second flange 310 may engage opening 306 of channel 304. In this manner, locking section 302 may be locked to base section 300.

As depicted, platform 204 has frame 316 with first planar section 318, second planar section 320, and compressible section 322. In the illustrative example, compressible section 322 is located between first planar section 318 and second planar section 320. Compressible section 322 may be comprised of a compressible material. The compressible material may be selected from one of a solid foam, a closed cell foam, a memory foam, or some other suitable material.

Platform 204 also includes a biasing system in the form of first spring 324 and second spring 326. As depicted, first spring 324 is connected to first planar section 318 and applies a force on first planar section 318 in the direction of arrow 328. In the illustrative example, second spring 326 is connected to second planar section 320 and applies a force on second planar section 320 in the direction of arrow 330.

Turning now to FIG. 4-15, an illustration of a process for forming a stringer on a skin is depicted in accordance with an illustrative embodiment. The process depicted in these figures may be implemented using tool system 200 as shown in FIG. 2 and FIG. 3.

Figure 4:
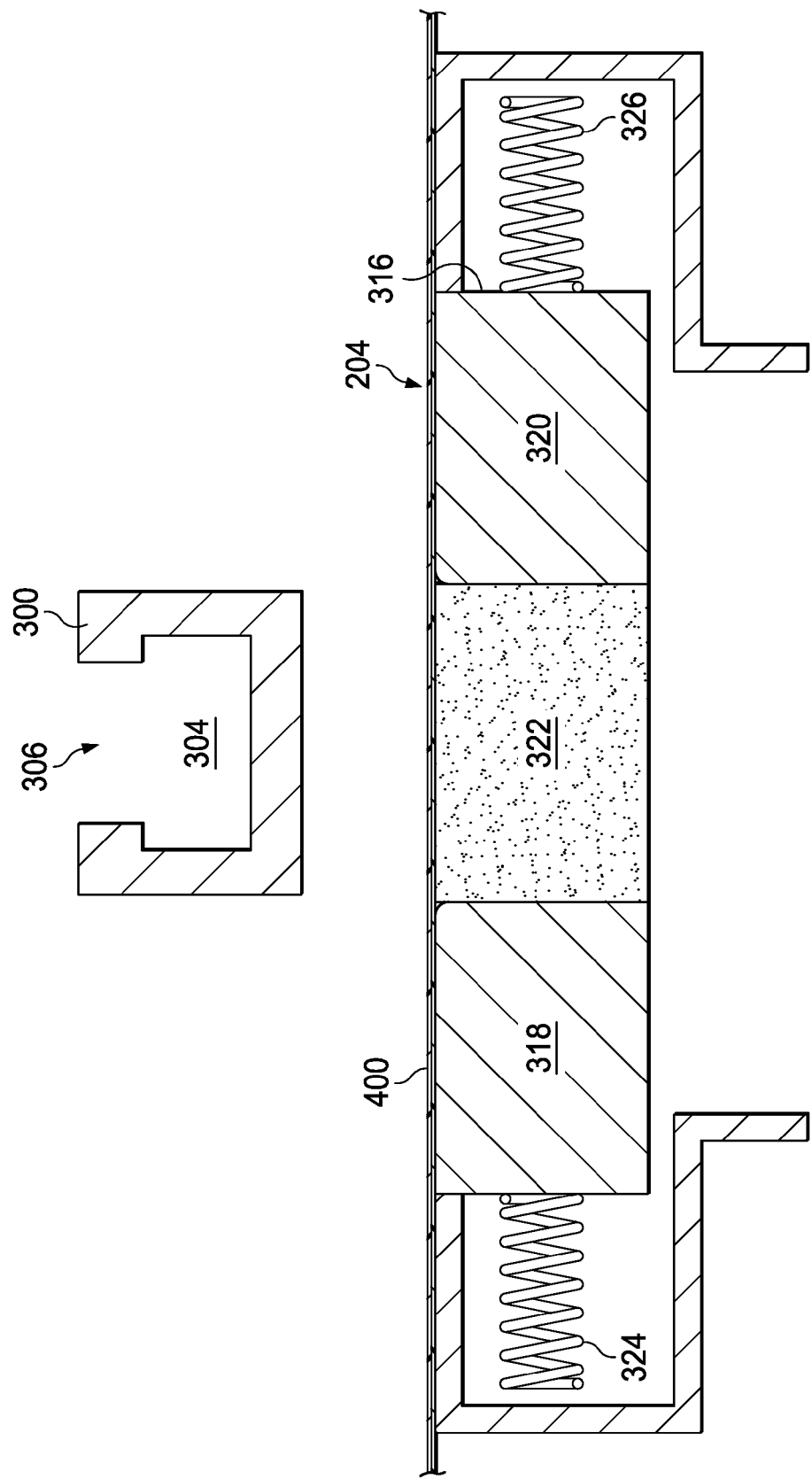
FIG. 4 is an illustration of a bagging material on a platform in accordance with an illustrative embodiment.

With reference first to FIG. 4, an illustration of a bagging material on a platform is depicted in accordance with an illustrative embodiment. In this figure, bagging material 400 is placed on platform 204. In the illustrative example, bagging material 400 may be comprised of a number of layers. As used herein, a "number of," when used with reference to an item, means one or more items. For example, a number of layers is one or more layers. The number of layers may be selected from at least one of a fluorinated ethylene propylene (FEP) layer, a peel ply, a thin breather, a nylon bagging film, or some other suitable layer.

As depicted, one piece of mandrel 202 is initially used. Base section 300 is positioned over bagging material 400 on platform 204.

Figure 5:
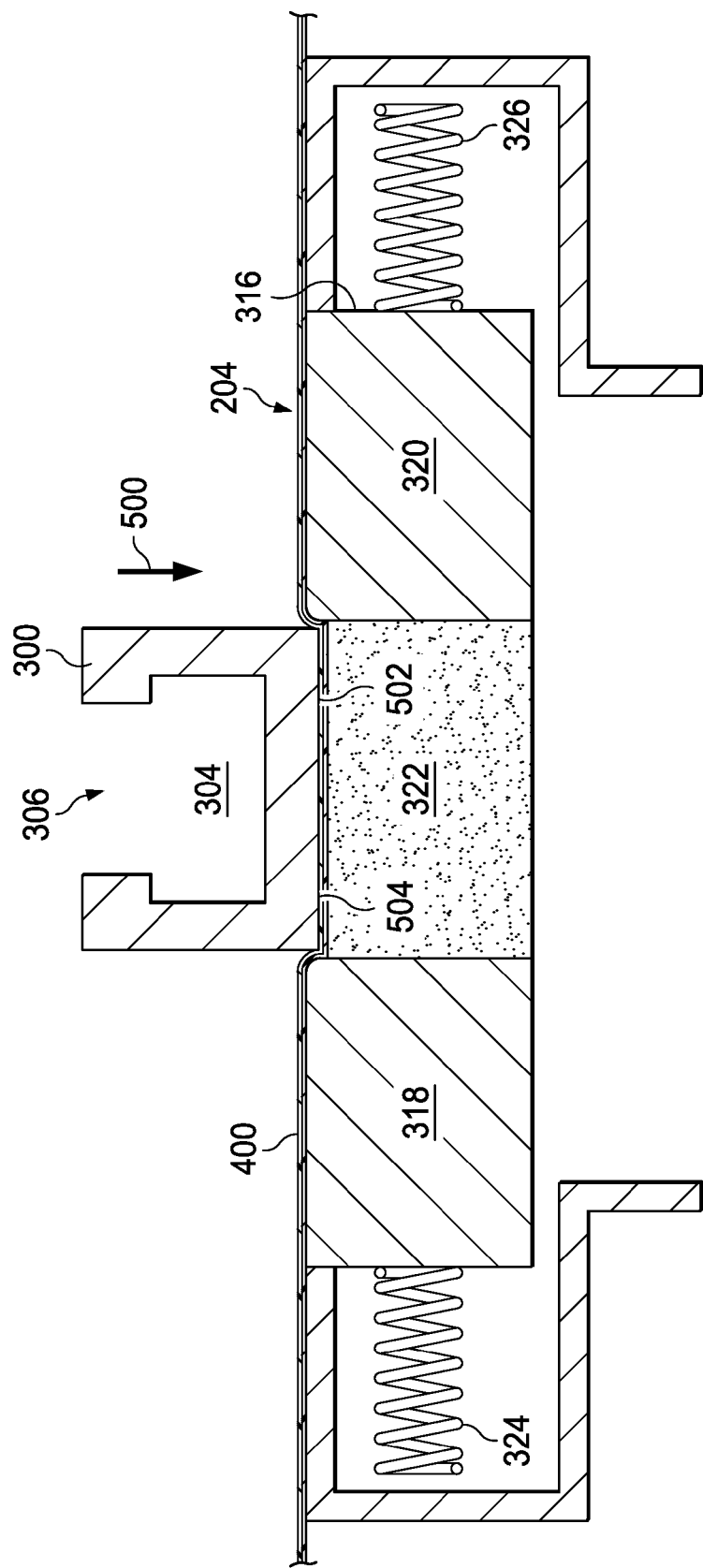
FIG. 5 is an illustration of a base section of a mandrel on a bagging material in accordance with an illustrative embodiment.

Turning now to FIG. 5, an illustration of a base section of a mandrel on a bagging material is depicted in accordance with an illustrative embodiment. In this illustrative example, base section 300 is moved downward in the direction of arrow 500 onto bagging material 400 on platform 204 at compressible section 322 of platform 204 located between first planar section 318 and second planar section 320 of platform 204. As depicted, compressible section 322 presses bagging material 400 against first side 502 of exterior surface 504 of base section 300 when base section 300 is moved downward in the direction of arrow 500 against compressible section 322.

Figure 6:
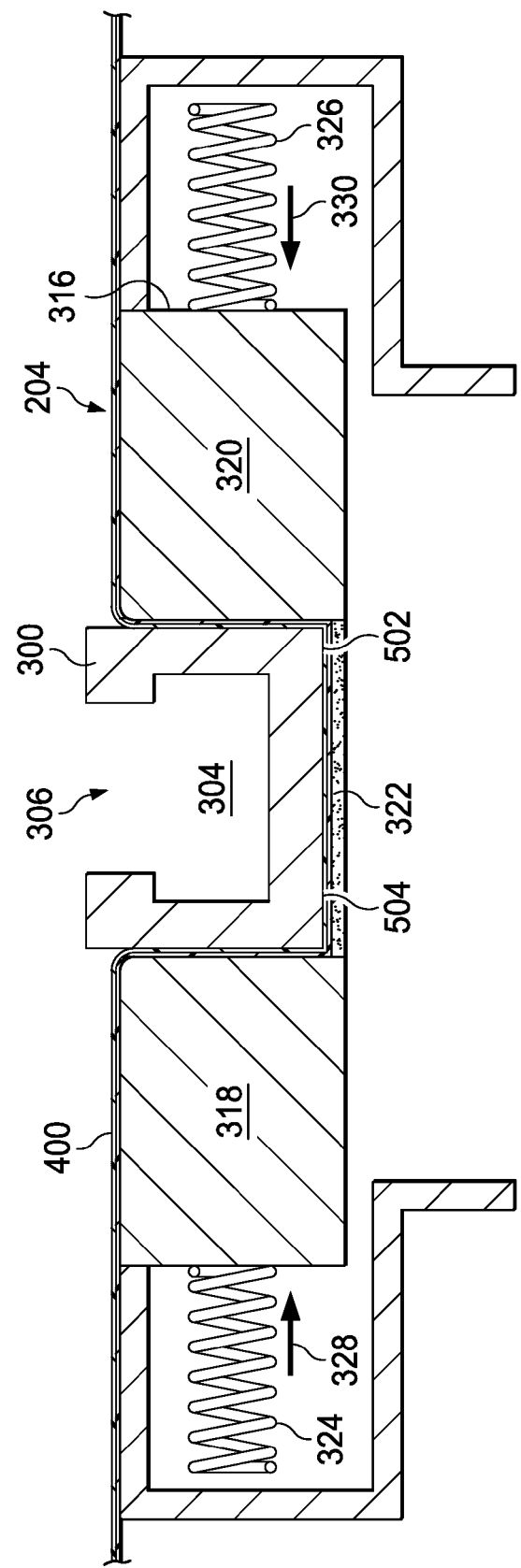
FIG. 6 is an illustration of a base section of a mandrel with a bagging material in a compressible section of a platform in accordance with an illustrative embodiment.

With reference next to FIG. 6, an illustration of a base section of a mandrel with a bagging material in a compressible section of a platform is depicted in accordance with an illustrative embodiment. In this example, base section 300 has been moved downward in the direction of arrow 500 in FIG. 5 such that first planar section 318 and second planar section 320 ensure that bagging material 400 is pressed against exterior surface 504 of base section 300 with a desired level of tightness. In particular, first planar section 318 applies a force against bagging material 400 in the direction of arrow 328, and second planar section 320 applies a force against bagging material 400 in the direction of arrow 330.

Figure 7:
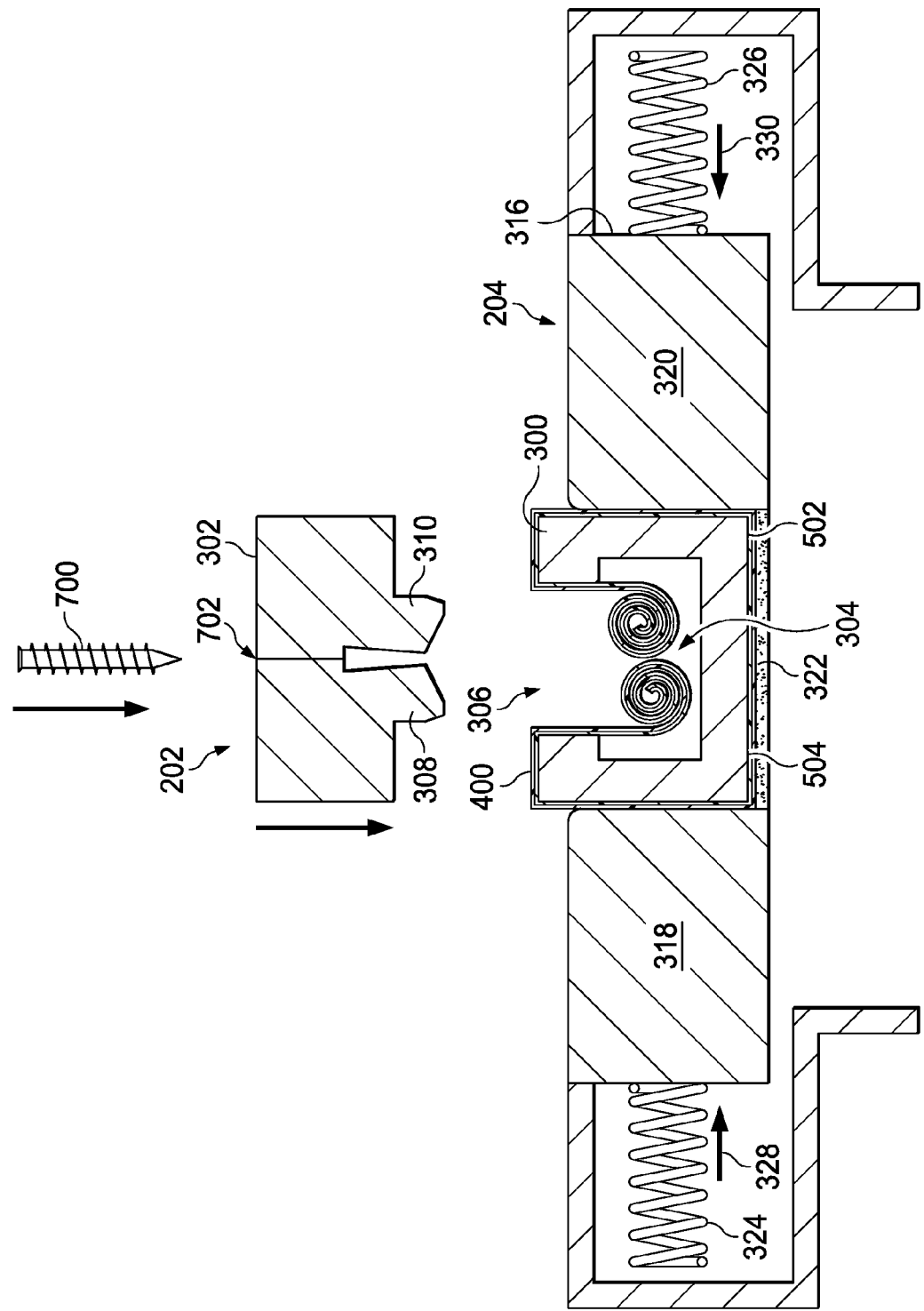
FIG. 7 is an illustration of a locking section positioned relative to a base section of a mandrel in accordance with an illustrative embodiment.

Turning now to FIG. 7, an illustration of a locking section positioned relative to a base section of a mandrel is depicted in accordance with an illustrative embodiment. In this illustration, bagging material 400 has been folded over on base section 300 of mandrel 202. Also, a portion of bagging material 400 is placed into channel 304 though opening 306 of channel 304.

Locking section 302 is positioned over opening 306 of channel 304. Screw 700 may be placed into hole 702 causing movement of first flange 308 and second flange 310.

Figure 8:
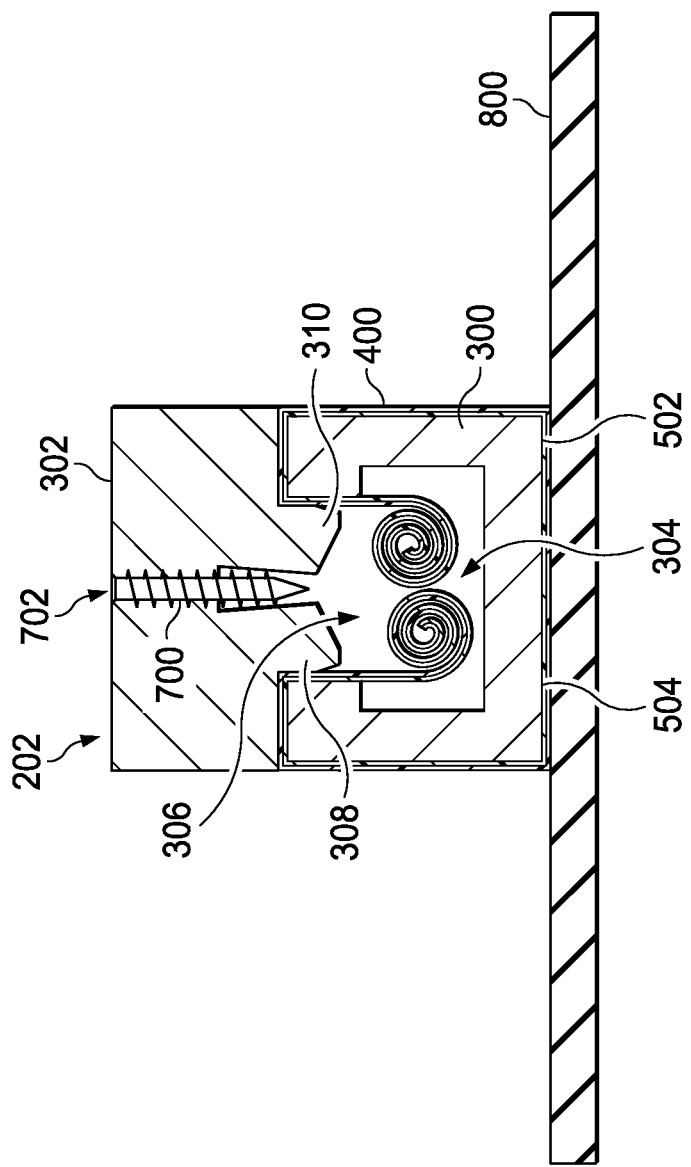
FIG. 8 is an illustration of a locking section engaged with a base section of a mandrel in accordance with an illustrative embodiment.

Turning now to FIG. 8, an illustration of a locking section engaged with a base section of a mandrel is depicted in accordance with an illustrative embodiment. In this figure, locking section 302 is engaged in channel 304 such that bagging material 400 is held in place around exterior surface 504 of base section 300. In particular, first flange 308 and second flange 310 are in opening 306 of channel 304. Screw 700 has been placed into hole 702 in locking section 302 such that first flange 308 has moved in the direction of arrow 312 and second flange 310 has moved in the direction of arrow 314, as seen in FIG. 3, to engage opening 306 of channel 304.

As can be seen in the illustrative example, bagging material 400 is held in place against exterior surface 504 of base section 300. Mandrel 202 with bagging material 400 has been placed in layers of composite material 800 in this example. A portion of bagging material 400 is held in channel 304 in this example. In this view, mandrel 202 with locking section 302 engaged in channel 304 of base section 300 has bagging material 400 held in a manner that reduces the time and effort needed to bag a stringer for curing.

In this manner, mandrel 202 with a bag formed by bagging material 400 and wrapped around mandrel 202 with a desired level of tightness is formed. Mandrel 202 is suitable for forming a stringer directly onto the mandrel 202 with the bag, without having to remove the stringer from mandrel 202, transferring the stringer onto a bond assembly jig, and bagging the stringer while the stringer is on the skin.

Figure 9:
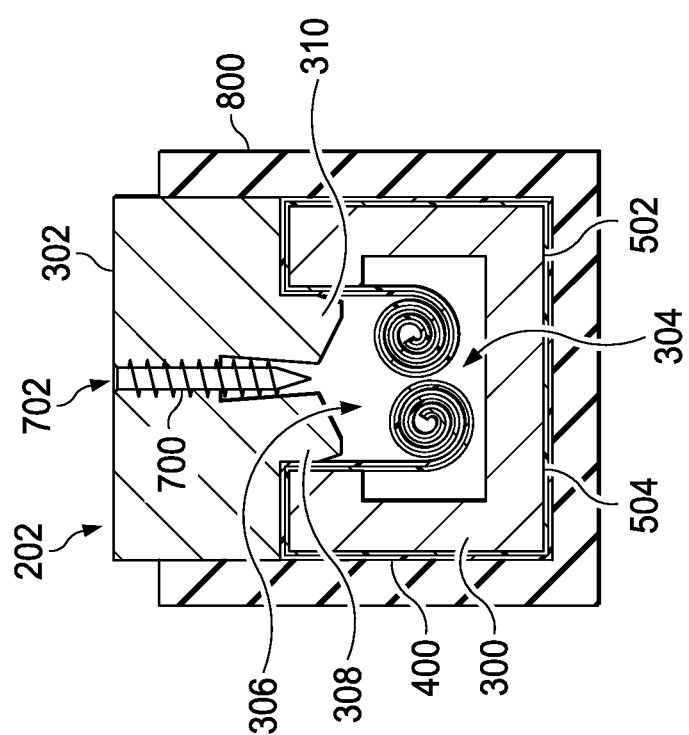
FIG. 9 is an illustration of layers of composite material draped on a mandrel with a bagging material in accordance with an illustrative embodiment.

Turning next to FIG. 9, an illustration of layers of composite material draped on a mandrel with a bagging material is depicted in accordance with an illustrative embodiment. In this illustration, layers of composite material 800 are draped over mandrel 202 with bagging material 400. In this illustrative example, bagging material 400 is already in place.

As depicted, layers of composite material 800 may be hot draped formed on mandrel 202. Layers of composite material 800 may be a stringer charge. Layers of composite material 800 may be hot draped all at once. In other examples, layers of composite material 800 may be hot draped layer by layer to form a stringer.

Currently, once the stringer is formed, the stringer is removed from the mandrel and placed onto the skin. Once the stringer is placed on the skin, the stringer is bagged with the skin. Currently, the stringer cannot be formed around the mandrel because of wrinkling that may occur with the bag. Also, forming the bag around the stringer does not allow the bag to be as taut as desired while wrapped around the mandrel. Thus, the current practice of forming the stringer on the mandrel and then removing the mandrel may result in wrinkles in the stringer. The movement of the uncured stringer increases the probability that undesired wrinkles may occur.

Figure 10:
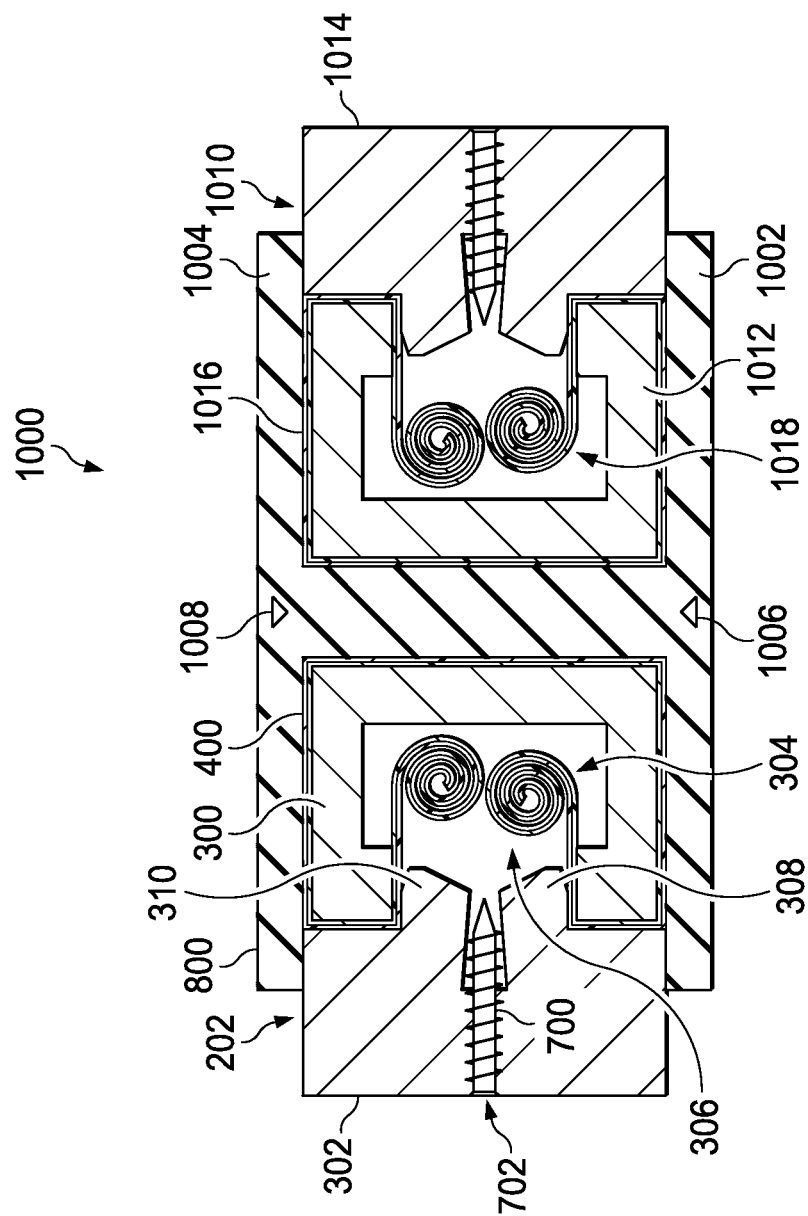
FIG. 10 is an illustration of a stringer with mandrels in accordance with an illustrative embodiment.

With reference to FIG. 10, an illustration of a stringer with mandrels is depicted in accordance with an illustrative embodiment. In this illustrative example, stringer 1000 is assembled having base 1002, cap 1004, noodle 1006, and noodle 1008. Base 1002 and cap 1004 are formed from layers of composite material 800.

As depicted, stringer 1000 has an I shape. The I shape is defined in part using mandrel 202. The I shape is also defined using mandrel 1010.

In this illustrative example, mandrel 1010 is the same as mandrel 202. Mandrel 1010 includes base section 1012 and locking section 1014. Bagging material 1016 is wrapped around base section 1012 and locked in place with locking section 1014 engaging channel 1018 in base section 1012.

Figure 11:
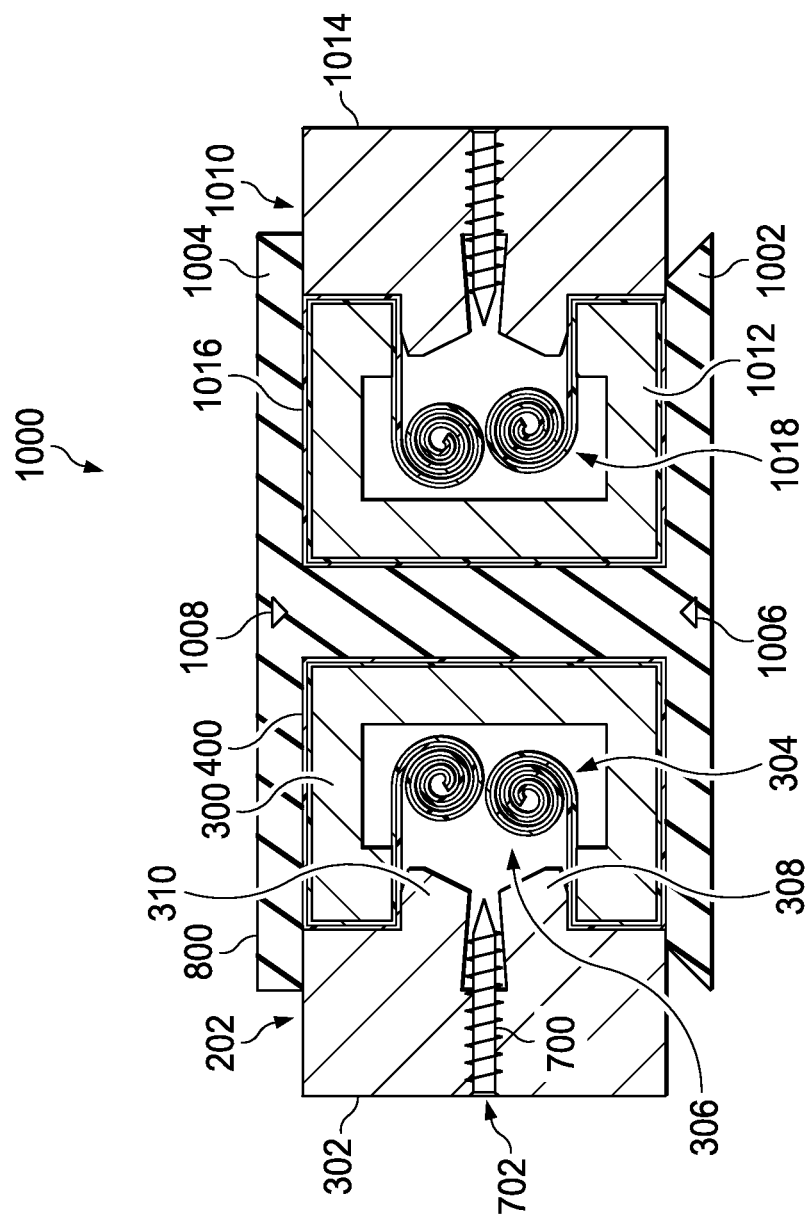
FIG. 11 is an illustration of a stringer with mandrels in accordance with an illustrative embodiment.

With reference to FIG. 11, an illustration of a stringer with mandrels is depicted in accordance with an illustrative embodiment. In this figure, base 1002 of layers of composite material 800 for stringer 1000 has been trimmed for placement on a skin.

Figure 12:
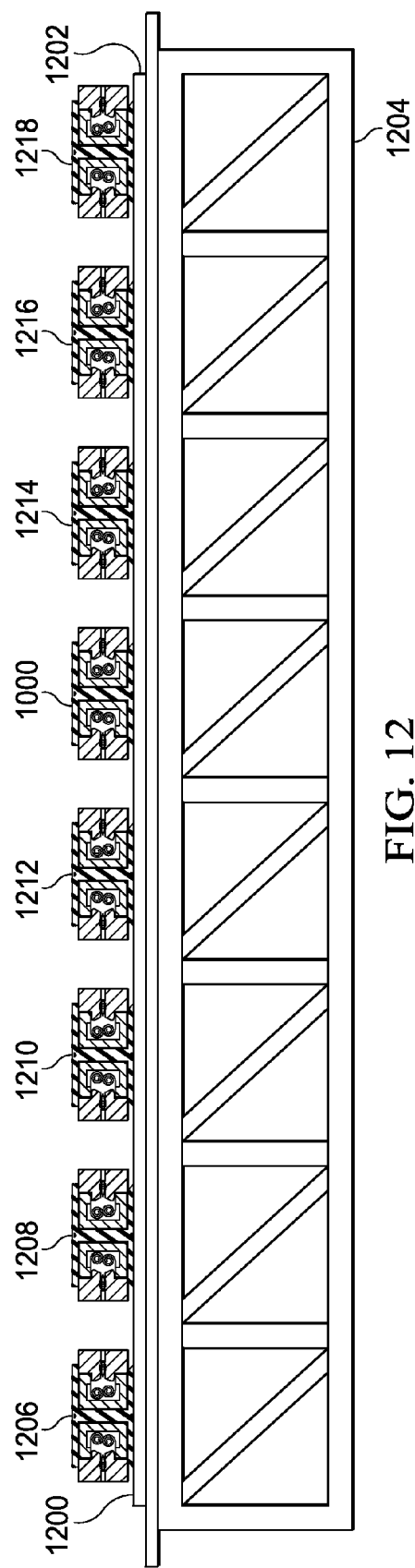
FIG. 12 is an illustration of stringers placed on a skin in accordance with an illustrative embodiment.

Turning next to FIG. 12, an illustration of stringers placed on a skin is depicted in accordance with an illustrative embodiment. Layers of composite material 1200 for skin 1202 have been laid up on tool 1204. In this example, skin 1202 is in an uncured state and may be referred to as an uncured skin.

As depicted, stringer 1000 has been placed on skin 1202. Additionally, stringer 1206, stringer 1208, stringer 1210, stringer 1212, stringer 1214, stringer 1216, and stringer 1218 also have been placed on skin 1202. In this illustrative example, these stringers have been formed in the same manner as stringer 1000.

Figure 13:
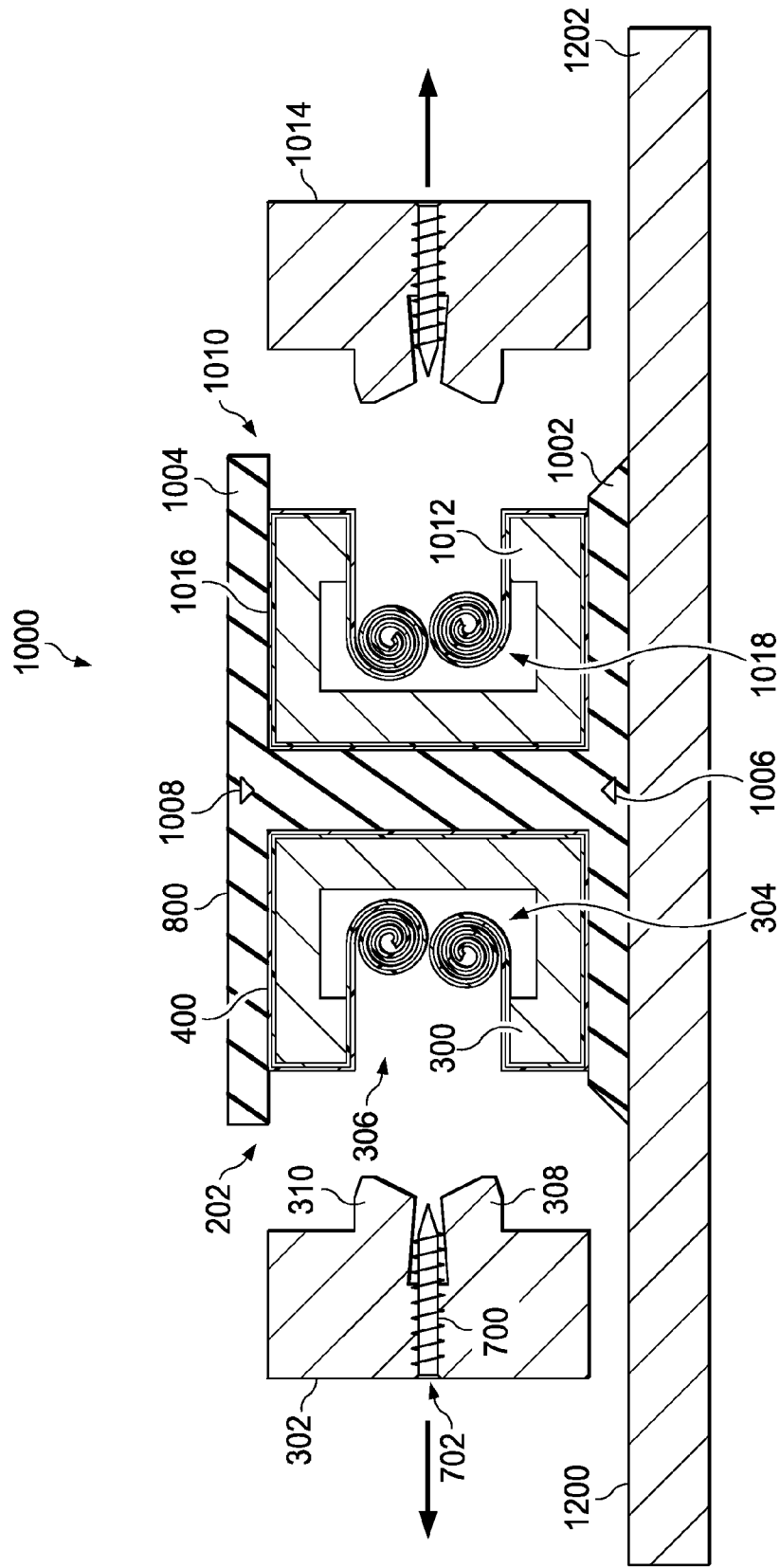
FIG. 13 is an illustration of a removal of locking sections in accordance with an illustrative embodiment.

With reference next to FIG. 13, an illustration of a removal of locking sections is depicted in accordance with an illustrative embodiment. In this figure, locking section 302 has been disengaged from channel 304 in base section 300, and locking section 1014 has been disengaged from channel 1018 in base section 1012. In the illustrative example, an electromagnetic effect treatment may be added to base 1002 of layers of composite material 800. The treatment includes cover exposed edges with fiberglass.

Figure 14:
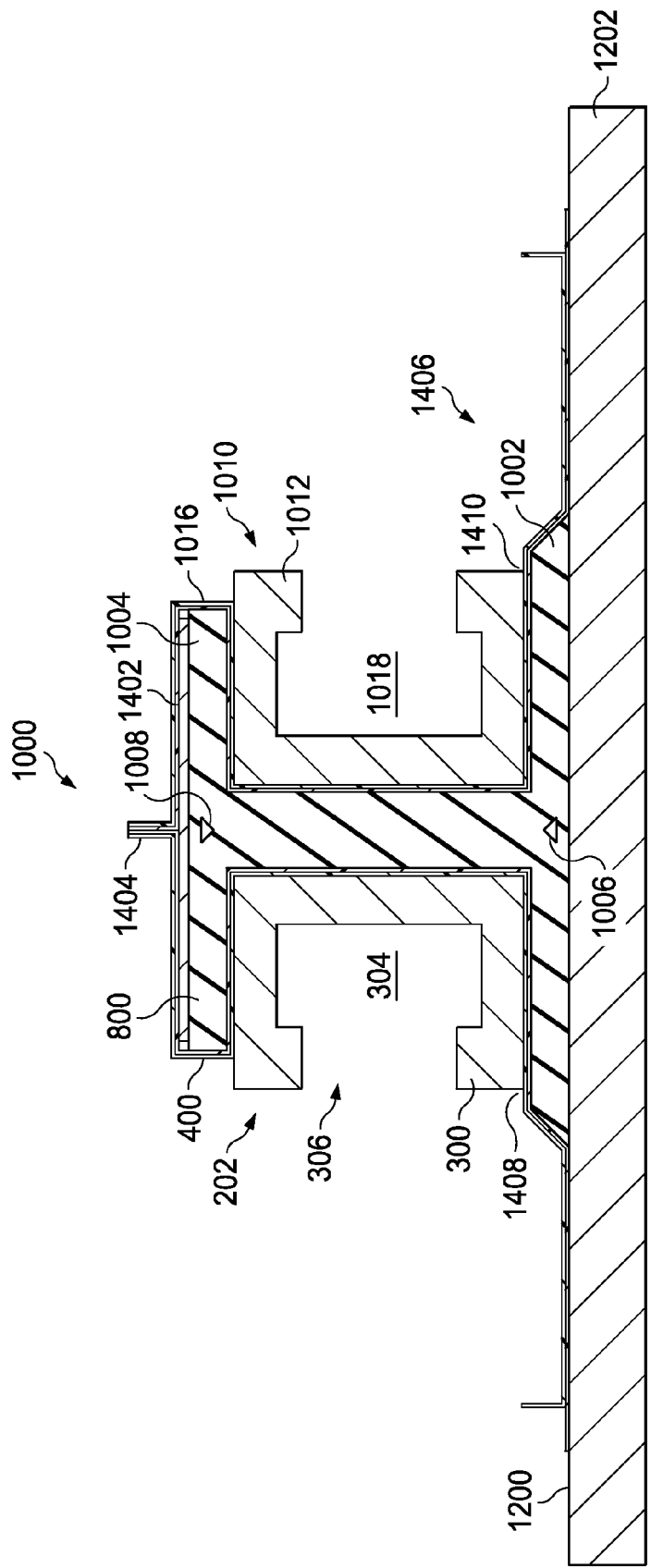
FIG. 14 is an illustration of a formation of a bag from a bagging material in accordance with an illustrative embodiment.

Turning next to FIG. 14, an illustration of a formation of a bag from a bagging material is depicted in accordance with an illustrative embodiment. The portions of bagging material 400 in channel 304 and bagging material 1016 in channel 1018 have been unfolded and removed from these channels.

Caul plate 1402 has been placed on cap 1004. Bagging material 400 and bagging material 1016 have been joined at location 1404 over caul plate 1402. Further, bagging material 400 and bagging material 1016 may be joined to skin 1202, other bagging materials on other strings, or some combination thereof.

This joining of the bagging materials is made such that a seal is formed. As depicted, bagging material 400 and bagging material 1016 are joined in a manner to form bag 1406 for stringer 1000. The seal is one sufficient means to apply a vacuum that generates a desired level of pressure on layers on composite material 800. The joining may be performed using at least one of tape, adhesive, heat, or other suitable mechanisms.

As depicted, base section 300 for mandrel 202 and base section 1012 for mandrel 1010 are located outside of bag 1406. As a result, pressure is not applied to base section 300 and base section 1012 when a vacuum is drawn on layers of composite material 800 for stringer 1000.

In this manner, base section 300 and base section 1012 may be comprised of lighter materials, have smaller thicknesses, or some combination thereof. The material, thicknesses, or other dimensions may be selected such that base section 300 and base section 1012 define a desired shape for stringer 1000 and maintain the desired shape during curing of stringer 1000 when exposed to heat in a curing system, such as an autoclave. As a result, base section 300 and base section 1012 may not sink into layers of composite material 1200 for skin 1202. As a result, a wave at edge 1408 and edge 1410 of stringer 1000 may be reduced or avoided.

Figure 15:
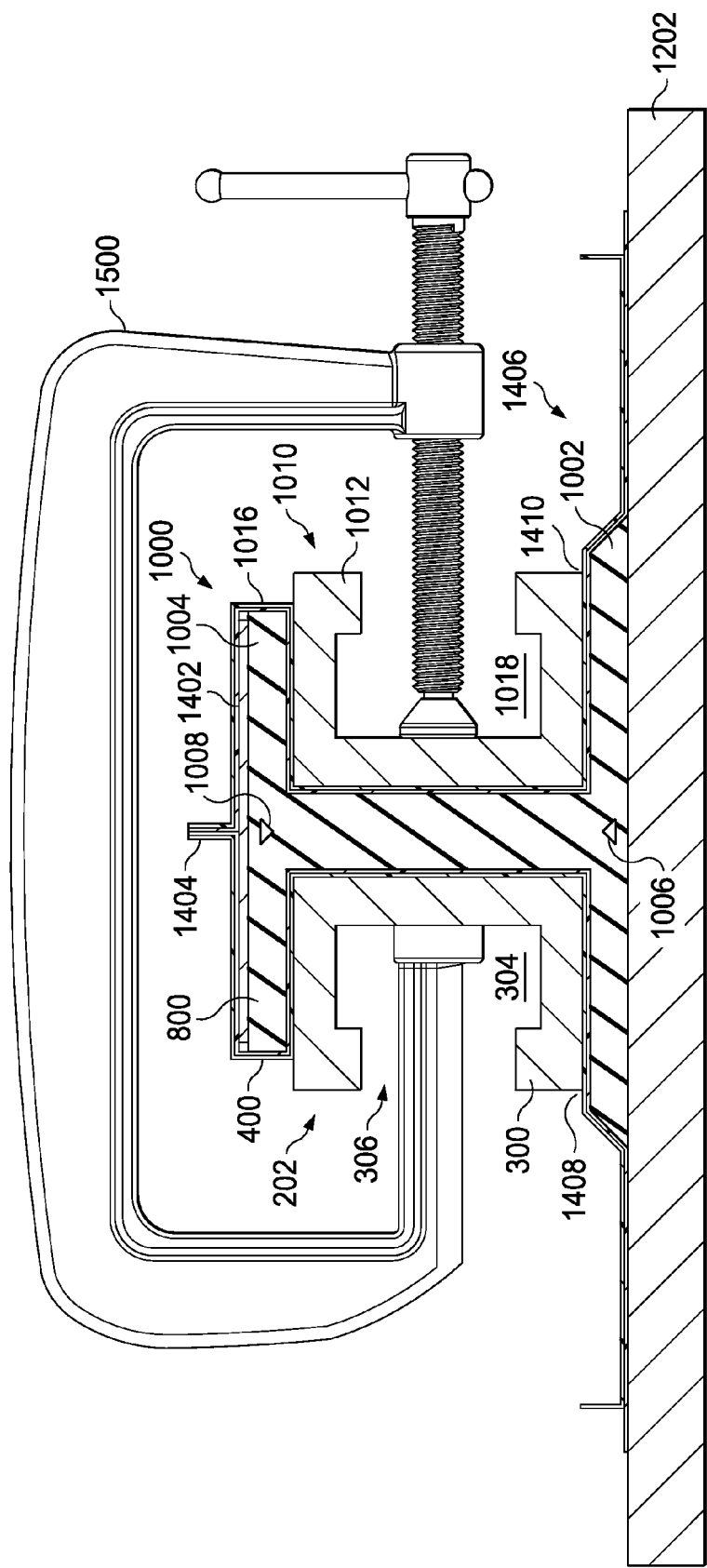
FIG. 15 is an illustration of a clamp on a stringer in accordance with an illustrative embodiment.

Turning to FIG. 15, an illustration of a clamp on a stringer is depicted in accordance with an illustrative embodiment. In this example, clamp 1500 contacts base section 300 and base section 1012. Clamp 1500 ensures that base section 300 and base section 1012 maintain contact with layers of composite material 800. Base section 300 and base section 1012 provide support for layers of composite material 800 forming stringer 1000. Bagging material 400 and bagging material 1016 do not lose bulk during curing in an autoclave in the illustrative example. As a result, increased control of dimensions of stringer 1000 may be maintained in the illustrative examples. Also, mark off caused by mandrels is reduced with base section 300 and base section 1012 being located outside of bag 1406. Mark up is an indentation or other feature that may be caused by pressure from a bag on a mandrel during curing of a stringer.

The illustration of the manufacturing of a composite wing in FIGS. 1-15 is not meant to limit the manner in which other illustrative examples may be implemented. For example, FIGS. 1-15 have been described with respect to co-curing stringers with a skin. In other illustrative examples, the process may cure the skin, place uncured stringers with the mandrel on the skin, and co-bond the uncured stringers with the cured skin. Co-bonding includes composite parts that are bonded to each other with an adhesive in which one composite part is cured in and the other composite part is uncured.

As another example, although screw 700 is shown as being placed into hole 702 to cause movement of first flange 308 and second flange 310, other structures may be used. For example, the structure may be selected from one of a tooling pin, a tapered pin, or some other suitable device that may be used to cause movement of first flange 308 and second flange 310.

Figure 16:
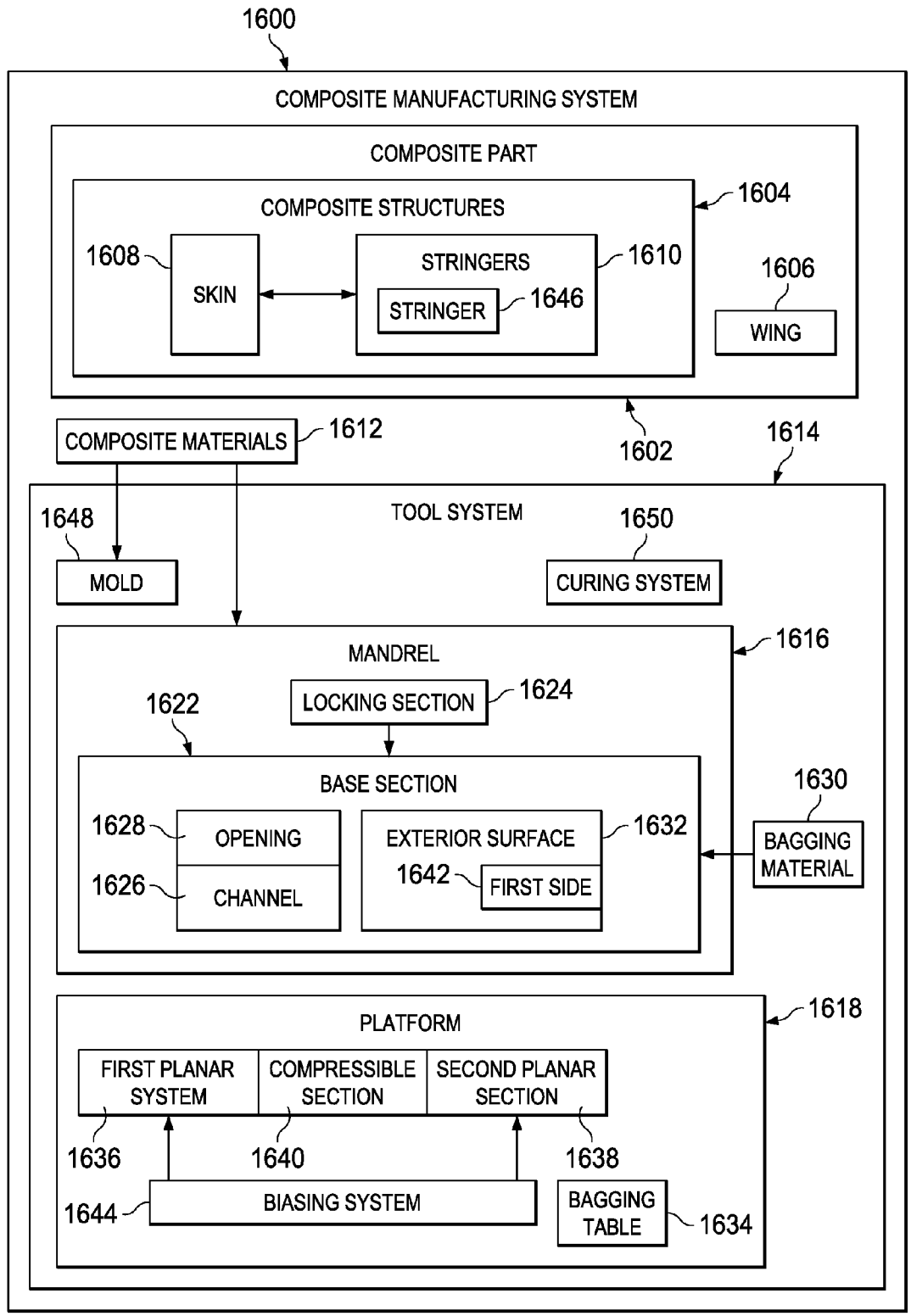
FIG. 16 is an illustration of a block diagram of a composite manufacturing system in accordance with an illustrative embodiment.

Turning next to FIG. 16, an illustration of a block diagram of a composite manufacturing system is depicted in accordance with an illustrative embodiment. In this illustrative example, composite manufacturing system 1600 manufactures composite part 1602 from composite structures 1604. As depicted, composite part 1602 takes the form of wing 1606 and composite structures 1604 comprises skin 1608 and stringers 1610. As depicted, tool system 1614 is used to manufacture composite part 1602.

As depicted, composite materials 1612 are laid up on tool system 1614 to form skin 1608 and stringers 1610 in an uncured state. As depicted, tool system 1614 includes mandrel 1616 and platform 1618.

Mandrel 1616 is a two piece mandrel. Mandrel 1616 comprises base section 1622 and locking section 1624. As depicted, base section 1622 of mandrel 1616 has channel 1626 with opening 1628 that receives a portion of bagging material 1630 wrapped around exterior surface 1632 of base section 1622. In the illustrative example, locking section 1624 of mandrel 1616 engages channel 1626 such that the portion of bagging material 1630 in channel 1626 is held inside channel 1626.

Platform 1618 is bagging table 1634 in this example. As depicted, platform 1618 comprises first planar section 1636, second planar section 1638, and compressible section 1640. In the illustrative example, compressible section 1640 is located between first planar section 1636 and second planar section 1638. Compressible section 1640 presses bagging material 1630 against first side 1642 of exterior surface 1632 when base section 1622 is moved downward against compressible section 1640.

In this illustrative example, platform 1618 also includes biasing system 1644. As depicted, biasing system 1644 moves first planar section 1636 and second planar section 1638 towards each other.

In this example, bagging material 1630 may be wrapped around base section 1622 and locked in placed by locking section 1624 of mandrel 1616. Then, composite materials 1612 may be laid up to form stringer 1646 in an uncured state using mandrel 1616 with bagging material 1630.

Composite materials 1612 are also laid up on mold 1648 in tool system 1614 to form skin 1608 in an uncured state. Stringer 1646 is placed on skin 1608. Locking section 1624 is removed and bagging material 1630 is moved to complete bagging stringer 1646 on skin 1608. In this example, base section 1622 is outside of bagging material 1630 when the bagging of stringer 1646 is completed.

Thereafter, curing system 1650 cures composite materials 1612 for stringer 1646 on skin 1608. The curing occurs with the application of heat and pressure. In this illustrative example, the pressure may be applied to form a vacuum applied to bagging material 1630. Pressure is not applied to base section 1622 because base section 1622 is outside of bagging material 1630. When curing system 1650 is an autoclave, curing system 1650 may also apply pressure.

In this manner, stringer 1646 and skin 1608 may be cured in one operation instead of curing these two components separately. Also, stringer 1646 may be bagged with bagging material 1630 more quickly using mandrel 1616 as compared to currently used mandrels. Also, with channel 1626 and the removal of locking section 1624, the weight of mandrel 1616 may be reduced when stringer 1646 is located on skin 1608 in the uncured state. Also, with base section 1622 being located outside of bagging material 1630, base section 1622 may be made of lighter materials, with less material, or some combination thereof as compared to when a mandrel is located inside of a bagging material and pressure is applied to the mandrel.

The illustration of composite manufacturing system 1600 in FIG. 16 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, mandrel 1616 in tool system 1614 may be used to form composite structures other than stringers 1610. For example, tool system 1614 may be used to fabricate longerons, stiffeners, ribs, or other suitable composite structures in which at least one of time for bagging, weight, or multiple curing steps may be of concern.

Also, the different components shown in FIGS. 1-15 may be combined with components in FIG. 16, used with components in FIG. 16, or a combination of the two. Additionally, some of the components in FIGS. 1-15 may be illustrative examples of how components shown in block form in FIG. 16 can be implemented as physical structures.

Figure 17:
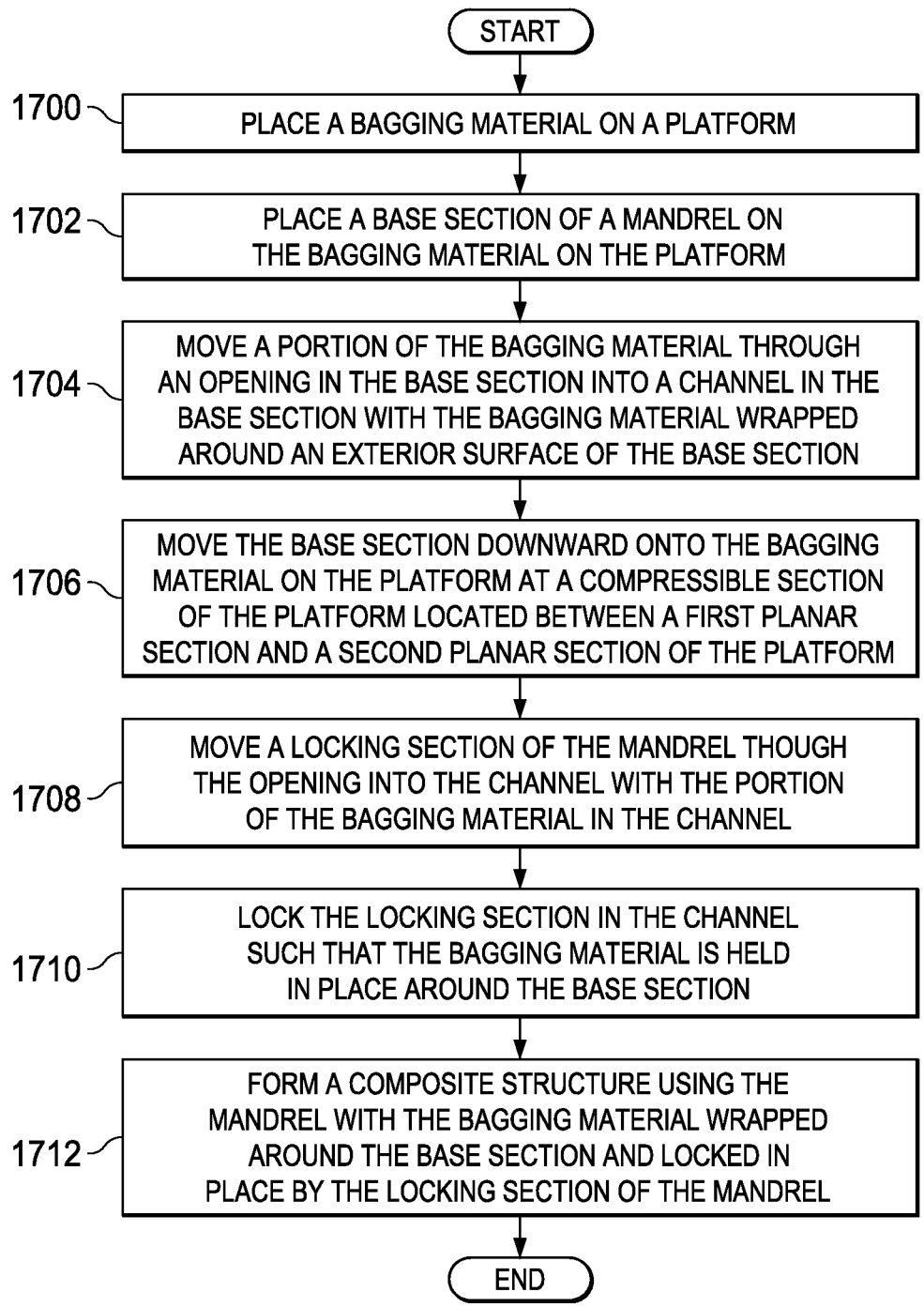
FIG. 17 is an illustration of a flowchart of a process for manufacturing a composite structure in accordance with an illustrative embodiment.

With reference next to FIG. 17, an illustration of a flowchart of a process for manufacturing a composite structure is depicted in accordance with an illustrative example, the process illustrated in FIG. 17 may be implemented in composite manufacturing system 1600 in FIG. 16. In particular, the process in FIG. 17 is used to place a bag aground a mandrel for use in forming a composite structure, such as a stringer.

The process begins by placing a bagging material on a platform (operation 1700). A base section of a mandrel is placed on the bagging material on the platform (operation 1702).

A portion of the bagging material is moved through an opening in the base section into a channel in the base section with the bagging material wrapped around an exterior surface of the base section (operation 1704). The base section is moved downward onto the bagging material on the platform at a compressible section of the platform located between a first planar section and a second planar section of the platform (operation 1706). The compressible section presses the bagging material against a first side of the exterior surface of the base section when the base section is moved downward against the compressible section.

Next, a locking section of the mandrel is moved though the opening into the channel with the portion of the bagging material in the channel (operation 1708). The locking section is locked in the channel such that the bagging material is held in place around the base section (operation 1710).

The process then forms a composite structure using the mandrel with the bagging material wrapped around the base section and locked in place by the locking section of the mandrel (operation 1712), with the process terminating thereafter. In operation 1712, a stringer in an uncured state may be formed. The stringer may be placed on the skin in an uncured state. These structures may be co-cured. In another illustrative example, operation 1712 may be performed by forming a stringer with the mandrel in an uncured state. This stringer may then be bonded to a skin in a cured state. With the skin in a cured state, the occurrence of waves or other inconsistencies in the stringer, skin, or both may be reduced or eliminated.

Figure 18:
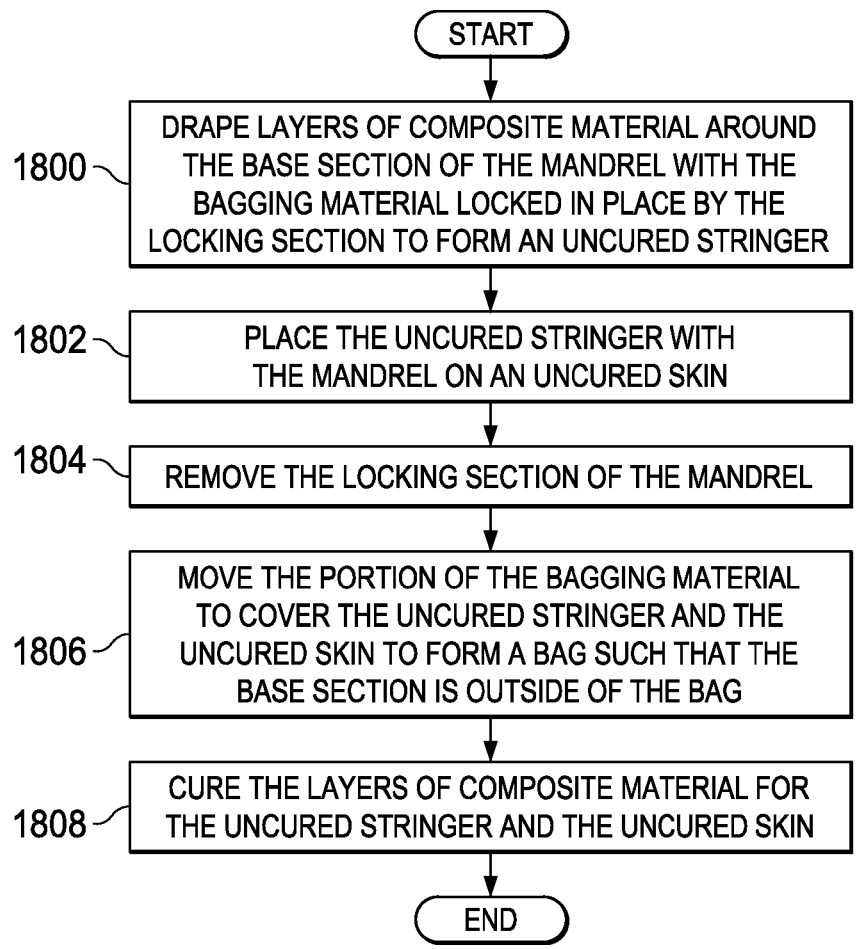
FIG. 18 is an illustration of a flowchart of a process for forming a stringer with a mandrel in accordance with an illustrative embodiment.

With reference next to FIG. 18, an illustration of a flowchart of a process for forming a stringer with a mandrel is depicted in accordance with an illustrative embodiment. The process in FIG. 18 is an example of one implementation of operation 1710 in FIG. 17 when the composite structure is a stringer.

The process begins by draping layers of composite material around the base section of the mandrel with the bagging material locked in place by the locking section to form an uncured stringer (operation 1800). The uncured stringer with the mandrel is placed on an uncured skin (operation 1802). The process then removes the locking section of the mandrel (operation 1804).

The portion of the bagging material is moved to cover the uncured stringer and the uncured skin to form a bag such that the base section is outside of the bag (operation 1806). The process then cures the layers of composite material for the uncured stringer and the uncured skin (operations 1808), with the process terminating thereafter.

Figure 19:
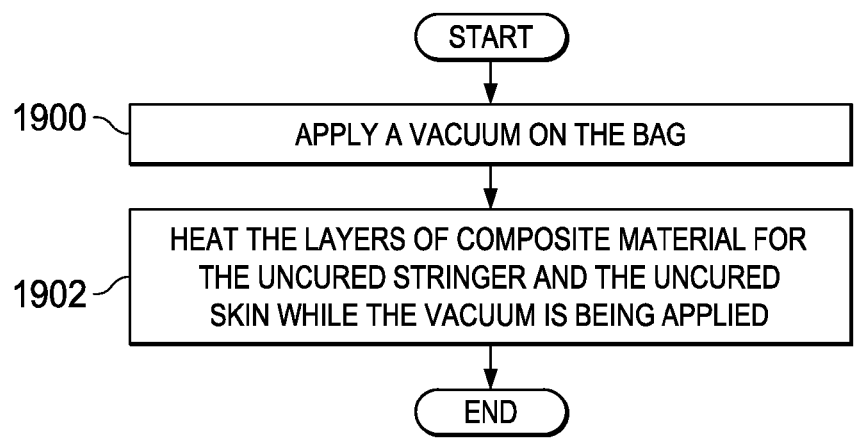
FIG. 19 is an illustration of a flowchart of a process for curing a stringer on a skin in accordance with an illustrative embodiment.

With reference next to FIG. 19, an illustration of a flowchart of a process for curing a stringer on a skin is depicted in accordance with an illustrative embodiment. The process in FIG. 19 is an example of an implementation of operation 1808 in FIG. 18.

The process begins by applying a vacuum on the bag (operation 1900). In operation 1900, the bagging material presses on composite materials that form the stringer in the uncured state. The pressure reduces wrinkles on the stringer during curing of the stringer. In operation 1900, the base section of the mandrel is located outside of the bag.

The process then heats the layers of composite material for the uncured stringer and the uncured skin while the vacuum is being applied (operation 1902), with the process terminating thereafter. In operation 1902, the layers of composite material for the uncured stringer and the uncured skin are located in an autoclave. In this example, pressure is applied to the layers of composite material for the uncured stringer and the uncured skin by pressurized gas in the autoclave while applying the vacuum and heating the layers of composite material and the skin. The gas may be air, nitrogen, an inert gas, or some other suitable gas.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 20:
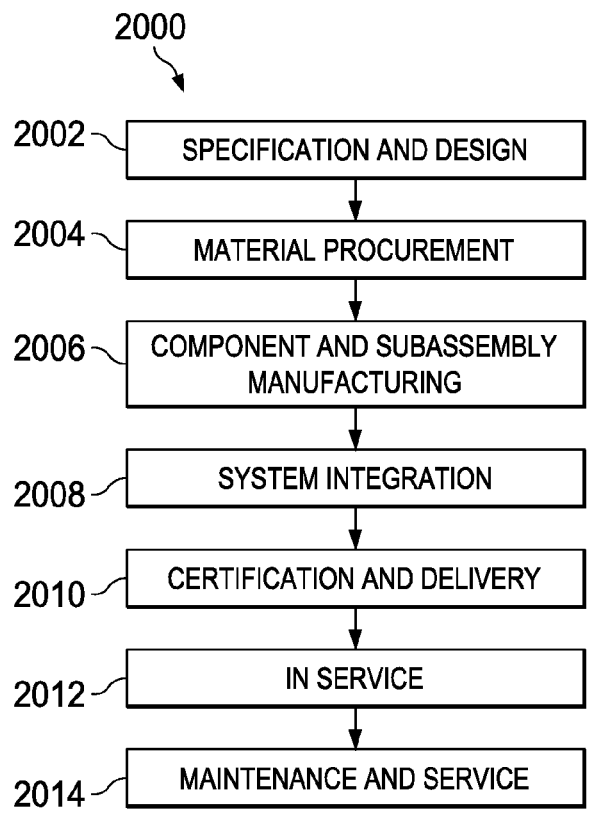
FIG. 20 is an illustration of a block diagram of an aircraft manufacturing and service method in accordance with an illustrative embodiment.
Figure 21:
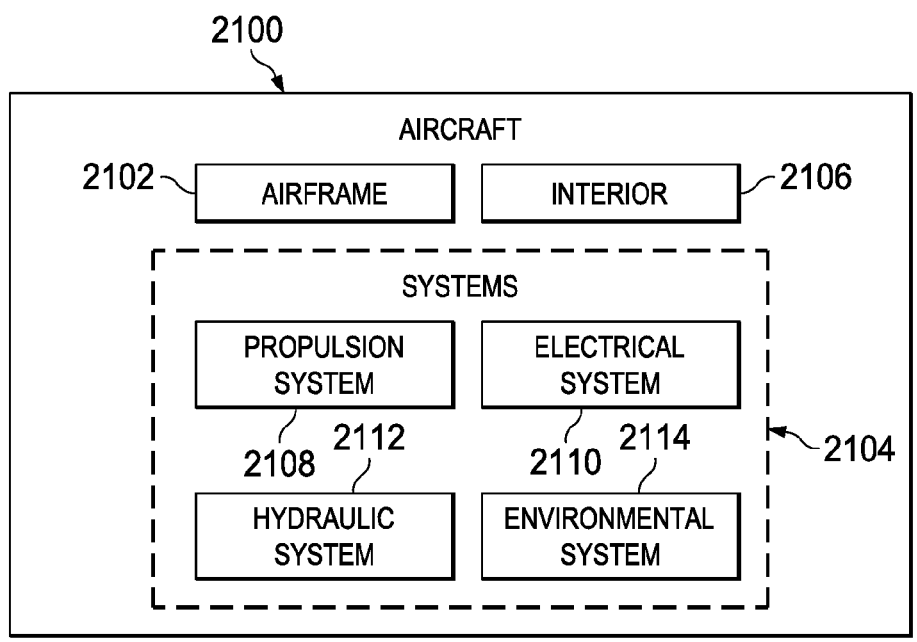
FIG. 21 is an illustration of a block diagram of an aircraft in which an illustrative embodiment may be implemented.

The illustrative embodiments of the disclosure may be described in the context of aircraft manufacturing and service method 2000 as shown in FIG. 20 and aircraft 2100 as shown in FIG. 21. Turning first to FIG. 20, an illustration of a block diagram of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of a block diagram of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 2000 in FIG. 20. In one illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20.

One or more apparatus embodiments, method embodiments, or a combination thereof may be utilized while aircraft 2100 is in service 2012, during maintenance and service 2014 in FIG. 20, or both. For example, wings may be fabricated during component and subassembly manufacturing using tool system 1614. In particular, different composite structures may be manufactured using mandrel 1616. Also, skins and stringers for wings may be formed during maintenance and service 2014 to rework wings on aircraft 2100. Also, wings may be formed for use in refurbishment, upgrades, or other operations during maintenance and service 2014.

The use of a number of the different illustrative embodiments may substantially expedite the assembly of aircraft 2100, reduce the cost of aircraft 2100, or both expedite the assembly of aircraft 2100 and reduce the cost of aircraft 2100. In particular, using tool system 1614 with mandrel 1616 reduces issues of increased time to manufacture wings, or other composite structures. Also, issues relating to waves in the stringer, skin, or both from the weight of the mandrel may be reduced.

Thus, the illustrative embodiments provide a method and apparatus for manufacturing a composite structure in a manner that solves problems such as the time to install and bag composite materials for a structure, such as a stringer. In addition to reducing the overall backing time, the illustrative embodiments also solve problems with a stringer sinking into a skin when the uncured stringer with a mandrel is placed onto an uncured skin. With the tool system and process for bagging, the need for additional mandrels caused by long processing times is also reduced.

Further, in one illustrative example, a stringer and a skin may be co-cured with each other. Alternatively, in another illustrative example, the skin may be in a cured form and the stringer in an uncured form when they may be co-bonded with each other. These processes may be performed with desired stringer dimensions such as radius definition, straightness, flatness, and other parameters. Further, the amount of handling or transferring of composite materials may be reduced in the different illustrative examples.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
    a first planar section;
    a second planar section;
    a base section of a mandrel that comprises: an exterior surface, and a channel that comprises an opening that receives a portion of a bagging material, the bagging material being wrapped around the exterior surface of the base section;
    a compressible section located between the first planar section and the second planar section, such that the compressible section presses the bagging material against a first side of the exterior surface in response to a movement of the base section downward against the compressible section; and
    a locking section of the mandrel that engages the channel such that the portion of the bagging material in the channel is held inside the channel.

2. The apparatus of claim 1 further comprising:
    a biasing system that moves the first planar section and the second planar section towards each other.

3. The apparatus of claim 1, wherein the base section is comprised of a material selected from at least one of graphite, graphite foam, titanium, aluminum, invar, or ceramic.

4. The apparatus of claim 1, wherein the locking section is flexible.

5. The apparatus of claim 4, wherein the locking section is comprised of a material selected from one of a nylon, a plastic, and aluminum.

6. The apparatus of claim 4, wherein the locking section has a hole and further comprising:
    a structure that causes the locking section to engage the channel when the structure is placed into the hole, wherein the structure is selected from one of a screw, a tooling pin, and a tapered pin.

7. A mandrel bagging system comprising:
    a base section of a mandrel that comprises: an exterior surface, and a channel that comprises an opening that receives a portion of a bagging material, the bagging material being wrapped around the exterior surface of the base section;
    a locking section of the mandrel that engages the channel such that the portion of the bagging material in the channel is held inside the channel; and
    a platform having a first planar section, a second planar section, and a compressible section located between the first planar section and the second planar section, wherein the compressible section presses the bagging material against a first side of the exterior surface when the base section is moved downward against the compressible section.

8. The mandrel bagging system of claim 7, wherein the base section and the locking section form a two piece mandrel.

9. The mandrel bagging system of claim 7, wherein the base section is comprised of a material selected from at least one of graphite, graphite foam, titanium, aluminum, invar, or ceramic.

10. The mandrel bagging system of claim 7, wherein the locking section is flexible and wherein the locking section is comprised of a material selected from one of a nylon, a plastic, and aluminum.

11. A method for manufacturing a composite structure, the method comprising:
    placing a bagging material on a platform;
    placing a base section of a mandrel on the bagging material on the platform;
    moving the base section downward onto the bagging material on the platform at a compressible section of the platform located between a first planar section and a second planar section of the platform, wherein the compressible section presses the bagging material against a first side of the exterior surface of the base section when the base section is moved downward against the compressible section;
    moving a portion of the bagging material through an opening in the base section into a channel in the base section after wrapping the bagging material around an exterior surface of the base section;

moving a locking section of the mandrel through the opening into the channel with the portion of the bagging material in the channel; and locking the locking section in the channel such that the bagging material is held in place around the base section.

12. The method of claim 11 further comprising:

forming the composite structure using the mandrel with the bagging material wrapped around the base section and locked in place by the locking section of the mandrel.

13. The method of claim 12, wherein the composite structure is a stringer and the forming step comprises:

draping layers of composite material around the base section of the mandrel with the bagging material locked in place by the locking section to form an uncured stringer;

placing the uncured stringer with the mandrel on an uncured skin;

removing the locking section of the mandrel; and moving the portion of the bagging material to cover the uncured stringer and the uncured skin to form a bag such that the base section is outside of the bag.

14. The method of claim 13, wherein the forming step further comprises:

curing the layers of composite material for the uncured stringer and the uncured skin.

15. The method of claim 14, wherein the curing step comprises:

applying a vacuum on the bag; and heating the layers of composite material for the uncured stringer and the uncured skin while the vacuum is being applied.

16. The method of claim 15, wherein the layers of composite material and the uncured skin are located in an autoclave and wherein the curing step further comprises:

applying pressure to the layers of composite material and the uncured skin while applying the vacuum and heating the layers of composite material and the uncured skin.

17. The method of claim 11 further comprising:

placing layers of composite material for a stringer on a skin for an aircraft.

18. The method of claim 12, wherein the composite structure is a stringer and the forming step comprises:

draping layers of composite material around the base section of the mandrel with the bagging material locked in place by the locking section to form an uncured stringer;

placing the uncured stringer with the mandrel on an uncured skin; and co-curing the uncured stringer and the uncured skin.

19. The method of claim 11, wherein the composite structure is selected from one of a stringer, a longeron, a stiffener and ribs.

* * * * *